US012659117B2

(12) United States Patent
Yuan et al.

(10) Patent No.:  US 12,659,117 B2
(45) Date of Patent:      Jun. 16, 2026

(54) DOWNLINK CONTROL INFORMATION COOPERATION

(71) Applicant: QUALCOMM Incorporated, San Diego, CA (US)

(72) Inventors: Fang Yuan, Beijing (CN); Wooseok Nam, San Diego, CA (US); Aleksandar Damnjanovic, Del Mar, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/254,455

(22) PCT Filed: Jan. 12, 2021

(86) PCT No.: PCT/CN2021/071235
§ 371 (c)(1),
(2) Date: May 25, 2023

(87) PCT Pub. No.: WO2022/150958
PCT Pub. Date: Jul. 21, 2022

(65) Prior Publication Data
US 2024/0007256 A1      Jan. 4, 2024

(51) Int. Cl.
*H04W 88/04*          (2009.01)
*H04L 5/00*            (2006.01)
*H04W 72/232*      (2023.01)

(52) U.S. Cl.
CPC ......... *H04L 5/0053* (2013.01); *H04W 72/232* (2023.01)

(58) Field of Classification Search
CPC ............. H04L 5/0053; H04L 25/0202; H04W 72/232; H04W 88/04
See application file for complete search history.

(56) References Cited

U.S. PATENT DOCUMENTS

2013/0153298 A1*  6/2013  Pietraski ............... H04W 72/21
                                                                      175/45
2017/0171899 A1*  6/2017  Seo ........................ H04W 88/04
(Continued)

FOREIGN PATENT DOCUMENTS

CN        104247300 A      12/2014
CN        106165510 A      11/2016
(Continued)

OTHER PUBLICATIONS

3GPP TSG RAN WG1 Meeting#88, R1-1702344 Title:Discussion on DMRS design for high speed scenario (Year: 2017).*
(Continued)

*Primary Examiner* — Faruk Hamza
*Assistant Examiner* — Abusayeed M Haque
(74) *Attorney, Agent, or Firm* — QUALCOMM Incorporated

(57)                    ABSTRACT

Certain aspects of the present disclosure provide techniques for downlink control information (DCI). A method that may be performed by a cooperative user equipment (UE) includes receiving configuration information for receiving control information associated with a target UE, receiving, based on the configuration information, the control information associated with the target UE, and forwarding the received control information to the target UE.

25 Claims, 12 Drawing Sheets

700

702
RECEIVE CONFIGURATION INFORMATION FOR RECEIVING CONTROL INFORMATION ASSOCIATED WITH A TARGET UE

704
RECEIVE, BASED ON THE CONFIGURATION INFORMATION, THE CONTROL INFORMATION ASSOCIATED WITH THE TARGET UE

706
FORWARD THE RECEIVED CONTROL INFORMATION TO THE TARGET UE

(56) References Cited

U.S. PATENT DOCUMENTS

| | | | | |
|---|---|---|---|---|
| 2019/0068274 A1* | 2/2019 | Han | .......................... | H04B 7/14 |
| 2020/0275413 A1 | 8/2020 | Zhang et al. | | |
| 2020/0389870 A1 | 12/2020 | Shin et al. | | |
| 2020/0404663 A1* | 12/2020 | Zhang | ................... | H04W 76/11 |
| 2021/0328725 A1* | 10/2021 | Jassal | ................... | H04L 1/1614 |

FOREIGN PATENT DOCUMENTS

| | | | |
|---|---|---|---|
| CN | 109565853 A | 4/2019 |
| CN | 109952804 A | 6/2019 |
| CN | 110290592 A | 9/2019 |
| CN | 111727575 A | 9/2020 |
| EP | 3681232 A1 | 7/2020 |
| WO | 2020197338 A1 | 10/2020 |

OTHER PUBLICATIONS

3GPP TSG RAN WG2 Meeting#97, R2-1701382 Title:Correcton to V2V Resource Reselection in TS 36.321 (Year: 2017).*
International Search Report and Written Opinion—PCT/CN2021/071235—ISA/EPO—Jun. 29, 2021.

* cited by examiner

Pattern 1

700

702

RECEIVE CONFIGURATION INFORMATION FOR RECEIVING CONTROL INFORMATION ASSOCIATED WITH A TARGET UE

704

RECEIVE, BASED ON THE CONFIGURATION INFORMATION, THE CONTROL INFORMATION ASSOCIATED WITH THE TARGET UE

706

FORWARD THE RECEIVED CONTROL INFORMATION TO THE TARGET UE

800

<div align="right">802</div>

RECEIVE CONFIGURATION INFORMATION FOR RECEIVING CONTROL INFORMATION ASSOCIATED WITH THE TARGET UE

<div align="right">804</div>

RECEIVE THE CONTROL INFORMATION ASSOCIATED WITH THE TARGET UE FROM A COOPERATIVE UE

DOWNLINK CONTROL INFORMATION COOPERATION

CROSS-REFERENCE TO RELATED APPLICATION(S)

This application is a national stage application under 35 U.S.C. 371 of PCT/CN2021/071235, filed Jan. 12, 2021, which is hereby expressly incorporated by reference herein in its entirety as if fully set forth below and for all applicable purposes.

INTRODUCTION

Field of the Disclosure

Aspects of the present disclosure relate to wireless communications, and more particularly, to techniques for obtaining downlink control information in a user equipment cooperation mode.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages for obtaining downlink control information in a user equipment cooperation mode.

Certain aspects of the subject matter described in this disclosure can be implemented in a method for wireless communication by a cooperative user equipment (UE). The method generally includes receiving configuration information for receiving control information associated with a target UE, receiving, based on the configuration information, the control information associated with the target UE, and forwarding the received control information to the target UE.

Certain aspects of the subject matter described in this disclosure can be implemented in an apparatus for wireless communication by a cooperative user equipment (UE). The apparatus generally includes at least one processor and a memory coupled to the at least one processor, the memory comprising code executable by the at least one processor to cause the apparatus to: receive configuration information for receiving control information associated with a target UE, receive, based on the configuration information, the control information associated with the target UE, and forward the received control information to the target UE.

Certain aspects of the subject matter described in this disclosure can be implemented in an apparatus for wireless communication by a cooperative user equipment (UE). The apparatus generally includes means for receiving configuration information for receiving control information associated with a target UE, means for receiving, based on the configuration information, the control information associated with the target UE, and means for forwarding the received control information to the target UE.

Certain aspects of the subject matter described in this disclosure can be implemented in a non-transitory computer readable medium for wireless communication by a cooperative user equipment (UE). The non-transitory computer readable medium generally includes instructions that, when executed by at least one processor, cause the at least one processor to: receive configuration information for receiving control information associated with a target UE, receive, based on the configuration information, the control information associated with the target UE, and forward the received control information to the target UE.

Certain aspects of the subject matter described in this disclosure can be implemented in a method for wireless communication by a target user equipment (UE). The method generally includes receiving configuration information for receiving control information associated with the target UE and receiving the control information associated with the target UE from a cooperative UE.

Certain aspects of the subject matter described in this disclosure can be implemented in an apparatus for wireless communication by a target user equipment (UE). The apparatus generally includes at least one processor and a memory coupled to the at least one processor, the memory comprising code executable by the at least one processor to cause the apparatus to: receive configuration information for receiving control information associated with the target UE and receive the control information associated with the target UE from a cooperative UE.

Certain aspects of the subject matter described in this disclosure can be implemented in an apparatus for wireless communication by a target user equipment (UE). The apparatus generally includes means for receiving configuration information for receiving control information associated with the target UE and means for receiving the control information associated with the target UE from a cooperative UE.

Certain aspects of the subject matter described in this disclosure can be implemented in a non-transitory computer readable medium for wireless communication by a target user equipment (UE). The non-transitory computer readable medium generally includes instructions that, when executed by at least one processor, cause the at least one processor to: receive configuration information for receiving control information associated with the target UE and receive the control information associated with the target UE from a cooperative UE.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
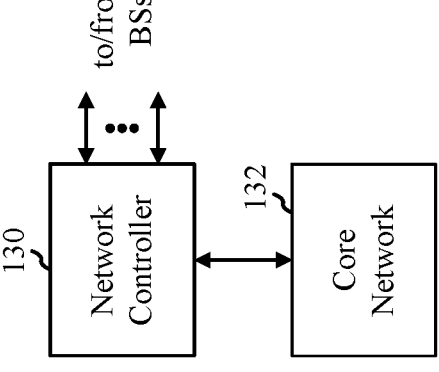
FIG. 1 is a block diagram conceptually illustrating an example wireless communication network, in accordance with certain aspects of the present disclosure.

Aspects of the present disclosure provide apparatus, methods, processing systems, and computer readable mediums for downlink control information (DCI) cooperation. For example, in some cases, certain devices within a wireless communication network, such as user equipments (UEs), may operate in a UE DCI cooperation mode in which a cooperative UE may receive control transmissions intended for a target UE from a base station in the wireless communication network and forwards the received control transmissions to the target UE. DCI cooperation may be especially helpful in certain scenarios, such as when a target UE is in poor channel conditions or coverage (e.g., on a cell edge).

Further, in some cases, DCI cooperation may also facilitate reducing power consumption and overhead associated with DCI/PDCCH monitoring at the target UE, for example, depending on the control information that is forwarded by the cooperative UE. For example, in some cases, the cooperative UE may simply forward in-phase and quadrature (IQ) samples corresponding to the control information to the target UE, allowing the target UE to demodulate and decode the control information locally. In other cases, to reduce power consumption and overhead at the target UE, the cooperative UE may demodulate the control information and forward the demodulated control information (e.g., as a number of binary bits) to the target UE, saving the target UE from having to monitor for and perform the demodulation of the control information and thereby saving power and monitoring overhead at the target UE. Further, in some cases, the cooperative UE may fully decode the control information and forward the decoded control information to the target UE, saving the target UE from having to monitor for, demodulate, and decode the control information and thereby saving significant power and monitoring overhead at the target UE.

The following description provides examples of DCI cooperation in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5GNR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for downlink control information (DCI) cooperation as described herein. For example, in some cases, the UE 120a may comprise a cooperative UE and may include a DCI cooperation manager 122a configured to perform the operations shown in FIG. 7 as well as other operations described herein for DCI cooperation, in accordance with aspects of the present disclosure. Additionally, in some cases, the UE 120b may comprise a target UE and may include a DCI cooperation manager 122b configured to perform the operations shown in FIG. 8 as well as other operations described herein for DCI cooperation. It should be noted that while UE 120a is described as being a cooperative UE, the UE 120a may also comprise a target UE with a DCI cooperation manager configured to perform the operations shown in FIG. 8. Likewise, while UE 120b is described as being a target UE, the UE 120b may also comprise a cooperative UE with a DCI cooperation manager configured to perform the operations shown in FIG. 7.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
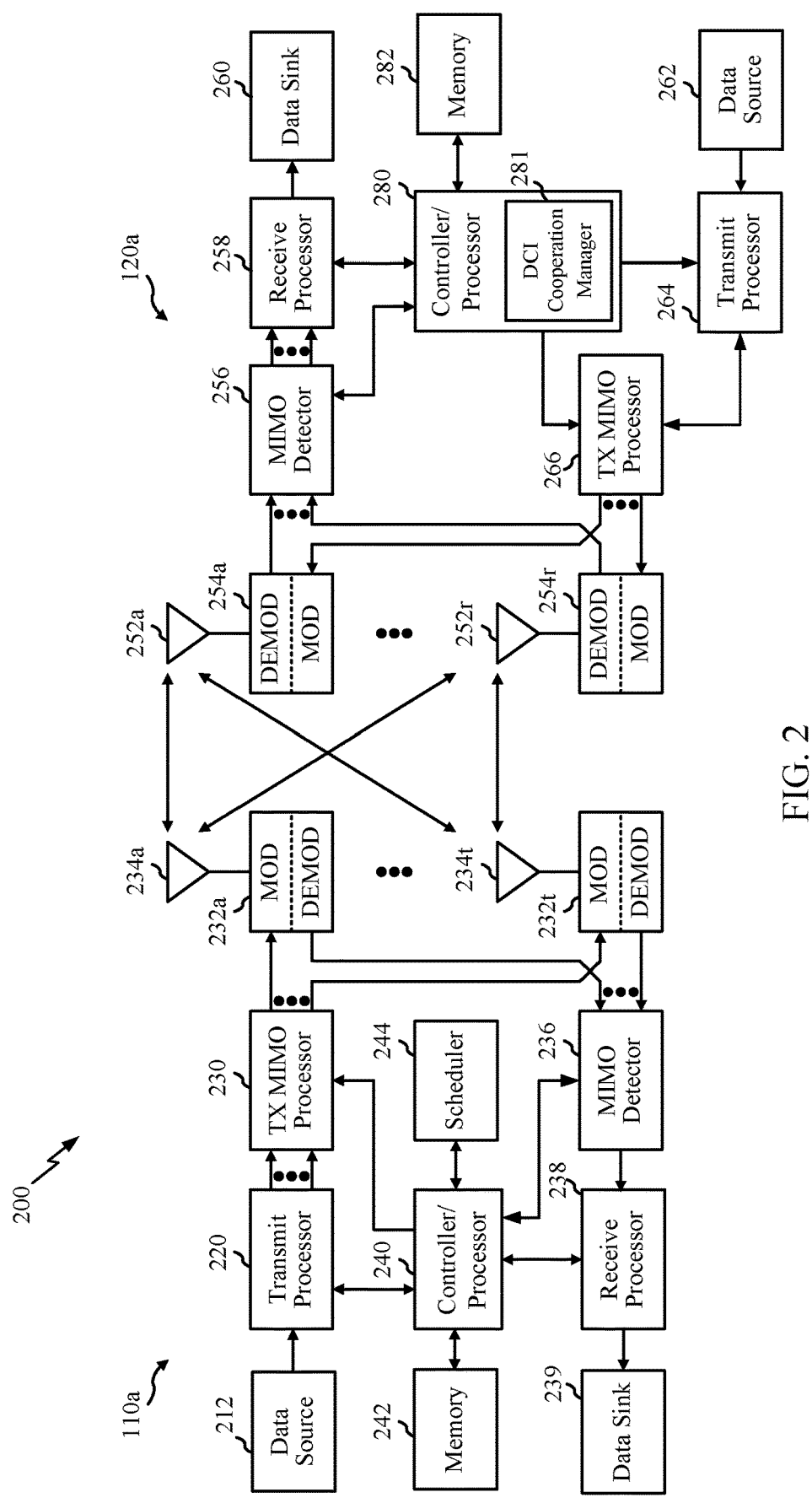
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the demodulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a*/120*b* and/or antennas 234, processors 220, 230, 238, and/or controller/processor 240 of the BS 110*a* may be used to perform the various techniques and methods described herein. For example, as shown in FIG. 2, the controller/processor 280 of the UE 120*a* and 120*b* includes a DCI cooperation manager 281 that may be configured to perform the operations shown in FIG. 7 and/or FIG. 8 as well as other operations described herein for DCI cooperation, according to aspects described herein. Although shown at the controller/processor, other components of the UE 120*a*/120*b* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
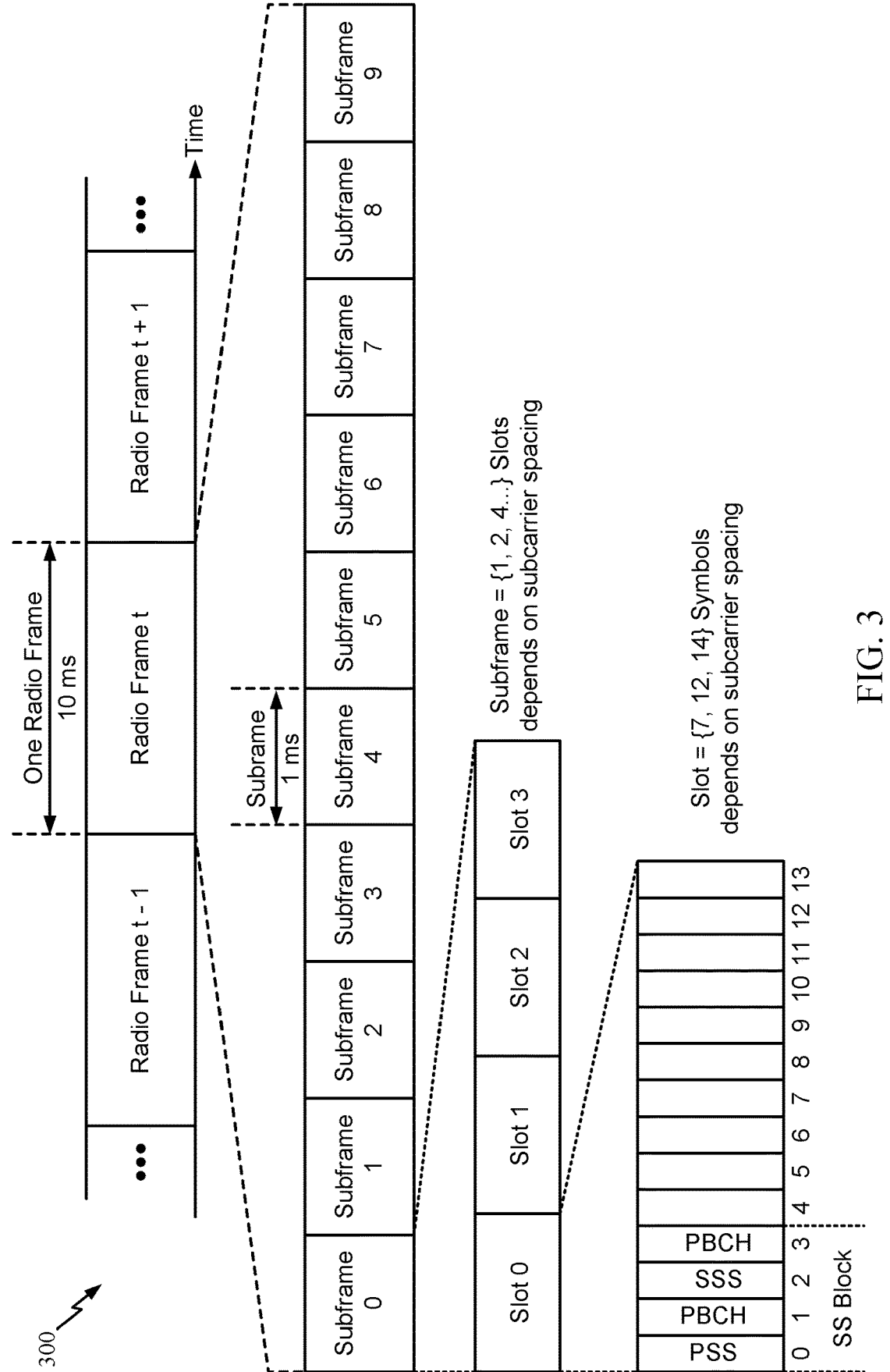
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Control Resource Sets (CORESETs)

A control resource set (CORESET) for an OFDMA system (e.g., a communications system transmitting physical downlink control channel (PDCCH) using OFDMA waveforms), such as the wireless communication network 100 of FIG. 1, may comprise one or more control resource (e.g., time and frequency resources) sets, configured for conveying downlink control information (DCI) on a PDCCH, within the system bandwidth (e.g., a specific area on the NR Downlink Resource Grid) and a set of parameters used to carry PDCCH/DCI. For example, a CORESET may by similar in area to an LTE PDCCH area (e.g., the first 1, 2, 3, 4 OFDM symbols in a subframe).

Within each CORESET, one or more search spaces (e.g., common search space (CSS), UE-specific search space (USS), etc.) may be defined for a given UE. Search spaces are generally areas or portions where a communication device (e.g., a UE) may monitor for control information.

According to aspects of the present disclosure, a CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. Aggregation levels may be generally defined as the number of CCEs that consist of a PDCCH candidate and may include aggregation levels 1, 2, 4, 8, and 18, which may be configured by a radio resource control (RRC) configuration of a search space set (SS-set).

A CORESET may be linked with the SS-set within the RRC configuration. For each aggregation level, the number of PDCCH candidates may be RRC configurable.

Operating characteristics of a NodeB or other base station in an NR communications system may be dependent on a frequency range (FR) in which the system operates. A frequency range may comprise one or more operating bands (e.g., "n1" band, "n2" band, "n7" band, and "n41" band), and a communications system (e.g., one or more NodeBs and UEs) may operate in one or more operating bands. Frequency ranges and operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying PDCCH within system bandwidth. A UE may determine a CORESET and monitors the CORESET for control channels. During initial access, a UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a bandwidth part (BWP) and a most significant bit corresponds to the first RB-group in the BWP.

According to aspects of the present disclosure, when a UE is connected to a cell (or BS), the UE may receive a master information block (MIB). The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 4:
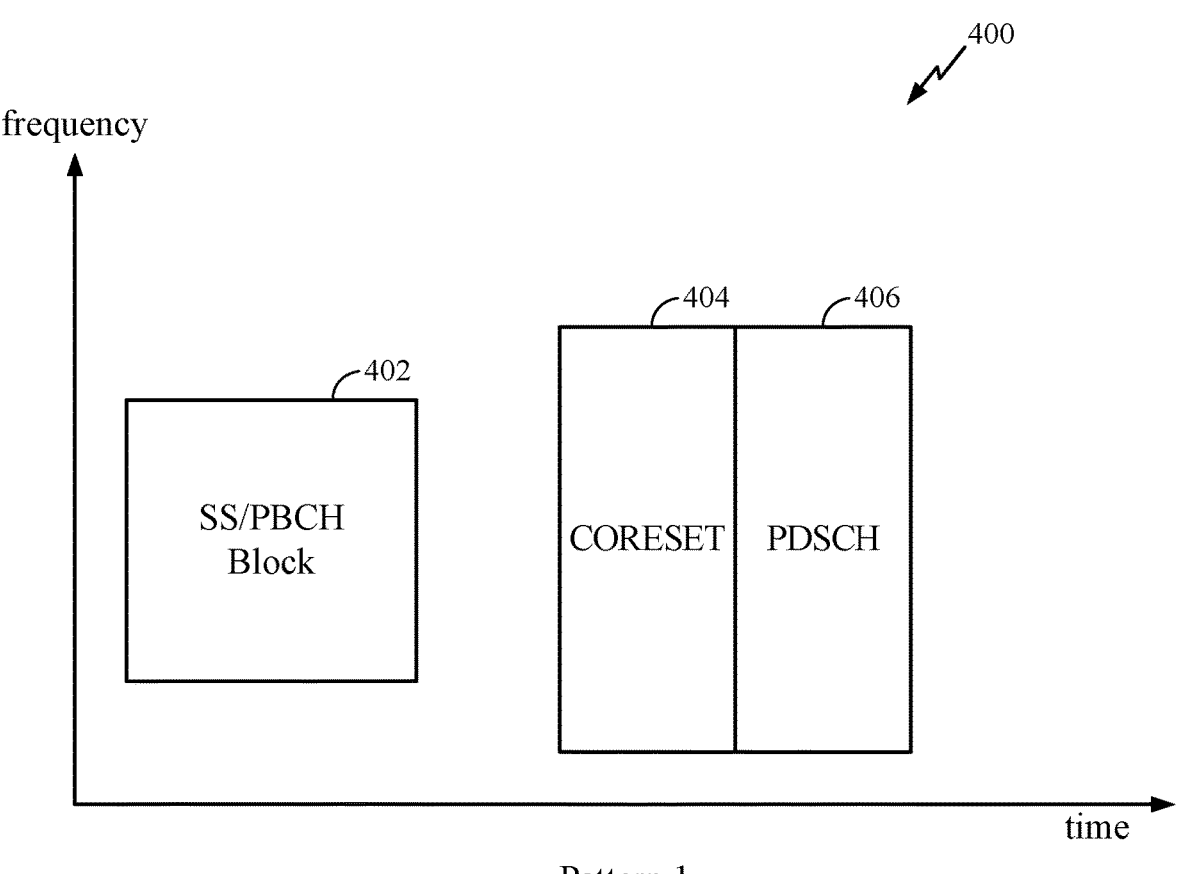
FIG. 4 shows an exemplary transmission resource mapping, according to aspects of the present disclosure.

FIG. 4 shows an exemplary transmission resource mapping 400, according to aspects of the present disclosure. In the exemplary mapping, a BS (e.g., BS 110a, shown in FIG. 1) transmits an SS/PBCH block 402. The SS/PBCH block includes a MIB conveying an index to a table that relates the time and frequency resources of the CORESET 404 to the time and frequency resources of the SS/PBCH block.

The BS may also transmit control signaling. In some scenarios, the BS may also transmit a PDCCH to a UE (e.g., UE 120, shown in FIG. 1) in the (time/frequency resources of the) CORESET. The PDCCH may schedule a PDSCH 406. The BS then transmits the PDSCH to the UE. The UE may receive the MIB in the SS/PBCH block, determine the index, look up a CORESET configuration based on the index, and determine the CORESET from the CORESET configuration and the SS/PBCH block. The UE may then monitor the CORESET, decode the PDCCH in the CORESET, and receive the PDSCH that was allocated by the PDCCH.

Different CORESET configurations may have different parameters that define a corresponding CORESET. For example, each configuration may indicate a number of resource blocks (e.g., 24, 48, or 96), a number of symbols (e.g., 1-3), as well as an offset (e.g., 0-38 RBs) that indicates a location in frequency.

Example Multi-Panel and UE Cooperation Operation

In certain systems, such as the wireless communication network 100 of FIG. 1, a UE may be able to transmit or receive transmissions using multiple antennas, beams, and/or antenna panels (e.g., antenna arrays). The transmissions may be received from or transmitted to a serving base station (BS) or transmission reception point (TRP) via a Uu interface. Transmission/reception of transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel uplink transmissions.

Figures 5A, 5B:
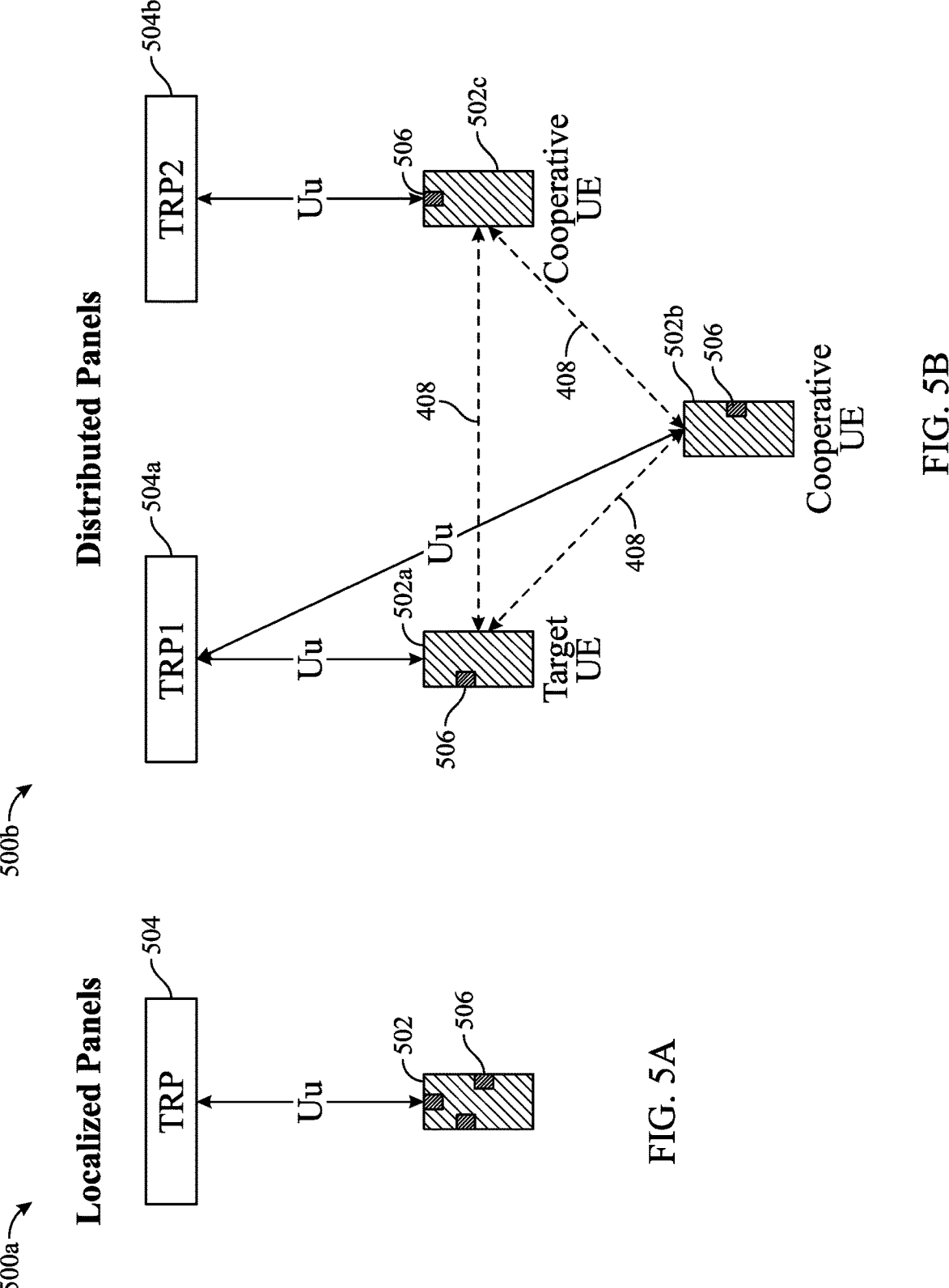
FIGS. 5A-5B illustrate wireless communication systems with localized and distributed panels, according to aspects of the present disclosure.

In some cases, the multiple antenna panels may be localized (e.g., co-located) within a single UE or may be distributed among multiple UEs. For example, FIG. 5A illustrates an example of localized antenna panels within a wireless communications network 500A. As illustrated in this example, a Uu interface may be established between a UE 502 (e.g., UE 120a) and a transmission reception point (TRP) 504 of a base station/gNB (e.g., BS 110a) in the wireless communications network 500A. Further, as illustrated, the UE 502 may include a plurality of colocated or localized antenna panels 506, which may be used by the UE 120a to transmit/receive transmissions to/from the TRP 504 using the Uu interface.

FIG. 5B illustrates an example of distributed antenna panels within a wireless communications network 500B. As illustrated in FIG. 5B, the wireless communications network 500B may include a plurality of entities, such as UE 502a, UE 502b, and UE 502c. Additionally, as shown, a separate Uu interface may be established between each of the UEs 502a-502c and a TRP of a base station/gNB. For example, as shown, a Uu interface may be established between the UE 502a and a first TRP 504a and between UE 502b and the first TRP 504a. Similarly, a Uu interface may be established between the UE 502c and a second TRP 504b.

In some cases, the entities shown in FIG. 5B (e.g., UEs 502a-502c) may operate in a UE cooperation mode to improve cellular throughput and coverage. For example, under UE cooperation, data transmissions from a base station (e.g., gNB) intended for a target entity/UE (TUE) (e.g., UE 502a) may be received by one or more cooperative entities/UEs (CUEs) (e.g., UE 502b or UE 502c) and forwarded to the TUE using a device-to-device (D2D) connection 508, such as a sidelink channel (e.g., through a PC5 interface), a WiFi connection, or the like. In some cases, each of the entities shown in FIG. 5B may be associated with an entity ID used for identifying that entity. In some cases, the entity ID may include a UE ID, a panel ID, a resource ID, or the like.

According to aspects, UE cooperation may be especially useful in situations where the TUE (e.g., UE 502a) is in poor channel conditions or coverage (e.g., on a cell edge), allowing CUEs (e.g., UE 502b and 502c) that are in better channel conditions to receive data transmissions from the gNB (or one or more TRPs 504a, 504b associated with the gNB) intended for the TUE and to forward these data transmissions to the TUE, thus improving cellular throughput and coverage.

In some cases, when the UEs 502a-502c operate according to a UE cooperation mode, antenna panels used for communicating with the BS/gNB (e.g., on the Uu interface) and/or with each other (e.g., on a sidelink channel) may be distributed among the UEs 502a-502c. For example, as illustrated in FIG. 5B, each of the UEs 502a-502c may include an antenna panel 506, which may be used for transmitting or receiving transmissions to/from the BS. For example, in some cases, when operating in the cooperation mode, cooperative UEs 502b and 502c may receive transmissions intended for target UE 502a from TRP 504a and TRP 504b using their respective antenna panels 506 and may thereafter use their respective antenna panels 506 to forward the transmissions to UE 502a.

Example Downlink Control Information Cooperation

As noted above, downlink control information (DCI) on a physical downlink control channel (PDCCH) may be carried in one or more CORESETs, spanning the first 1, 2, 3, 4 OFDM symbols of a subframe/slot. Within each CORESET, one or more search spaces (e.g., common search space (CSS), UE-specific search space (USS), etc.) may be defined for a given UE where each SS is associated with one CORESET. Search spaces are generally areas or portions where a communication device (e.g., a UE) may look for control information.

In some cases, different UEs within a wireless communication network (e.g., wireless communication network 100 in FIG. 1) may be assigned different CORESETs and search spaces for receiving a PDCCH. In some cases, under a UE non-cooperation mode, each UE may need to perform blind decoding (BD) and channel estimation (CE) within a particular search space assigned to that UE to detect and receive a PDCCH within its assigned CORESET.

Figures 6A, 6B:
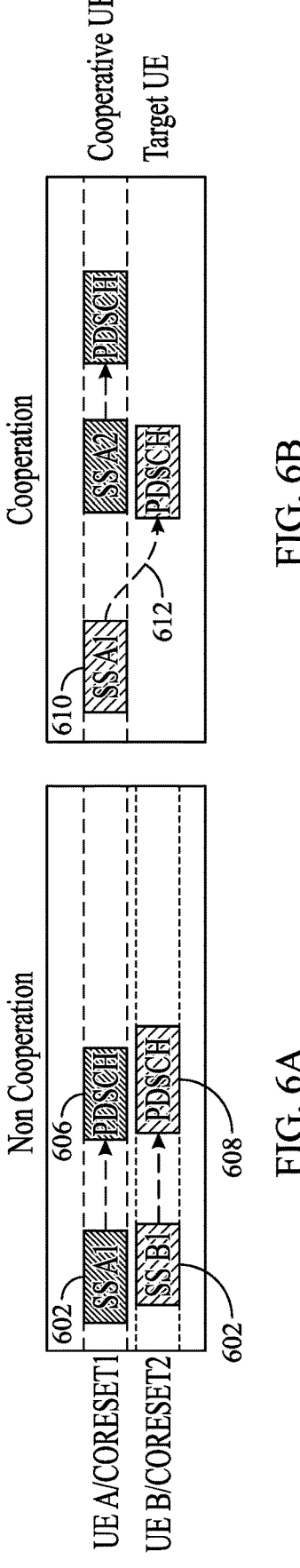
FIGS. 6A-6B illustrate example a non-UE cooperation mode and a UE cooperation mode, according to aspects of the present disclosure.

For example, as illustrated in FIG. 6A, under a non-UE cooperation mode, a first UE (e.g., UE A) may be assigned a first CORESET and a first search space 602 (e.g., SS A1) for receiving a first PDCCH (e.g., for receiving DCI within the first PDCCH) while a second UE (e.g., UE B) may be assigned a second CORESET and second search space 604 (e.g., SS B1) for receiving a second PDCCH (e.g., for receiving DCI within the second PDCCH). In some cases, each of the first PDCCH and second PDDCH may schedule a PDSCH for the first UE and the second UE, respectively. For example, as illustrated, the first UE may monitor for and receive the first PDCCH within the first search space 602 and first CORESET. Based on scheduling information within the first PDCCH, the first UE may receive a first PDSCH 606. Similarly, the second UE may monitor for and receive the second PDCCH within the second search space 604 and second CORESET. Based on scheduling information within the second PDCCH, the second UE may receive a second PDSCH 608.

As noted above, monitoring for and receiving DCI within a PDCCH may require the UE to perform a number of blind decodes and channel estimations. Consequently, due to having to perform the blind decoding and the channel estimation, monitoring for DCI within the PDCCHs at a UE (or antenna panel) may consume a significant amount of power and may be limited based on a capability of the UE (e.g., the UE may be limited in the number of blind decodes and channel estimations that may be performed based on a UE capability). Further, for a non-cooperation mode, having separate UEs each monitoring different PDCCHs may result in significant signaling and processing overhead.

Thus, aspects of the present disclosure provide techniques for reducing power consumption and overhead associated with DCI/PDCCH monitoring. For example in some cases, such techniques may involve receiving/conveying control information (e.g., DCI) using a UE cooperation mode, which may be known as "DCI cooperation". More specifically, DCI cooperation (e.g., as opposed to techniques in which data transmissions are received and forwarded by cooperative UEs) may involve, for example, a cooperative UE receiving control information intended for a target UE and the cooperative UE forwarding the control information to the target UE. For example, as illustrated in FIG. 6B, a cooperative UE may monitor a first search space 610 and receive control information associated with a target UE. The cooperative UE may then forward the control information to the target UE, as shown at 612.

According to aspects, by allowing control information intended for a target UE to be received and forwarded by a cooperative UE, power consumption (e.g., for at least the target UE) may be reduced. Further, overall control information overhead may be reduced as DCI cooperation does not require every UE to monitor for control information. Instead, the cooperative UE may monitor for and receive the control information for the target UE, allowing the target UE to reduce its monitoring. Additionally, DCI cooperation may help obviate UE capability limitations when monitoring for control information. For example, in some cases, a more-capable cooperative UE may be able to perform more blind decodes and channel estimations than the target UE alleviating the capability limitations for monitoring for the control information for the target UE. Additionally, in some cases, blind detection/decode and channel estimation capabilities may be split or shared among the cooperative UE and the target UE. Lastly, DCI cooperation may improve control channel reliability as multiple UEs may monitor for and receive the control information, increasing the chances that the control information is received correctly.

Figure 7:
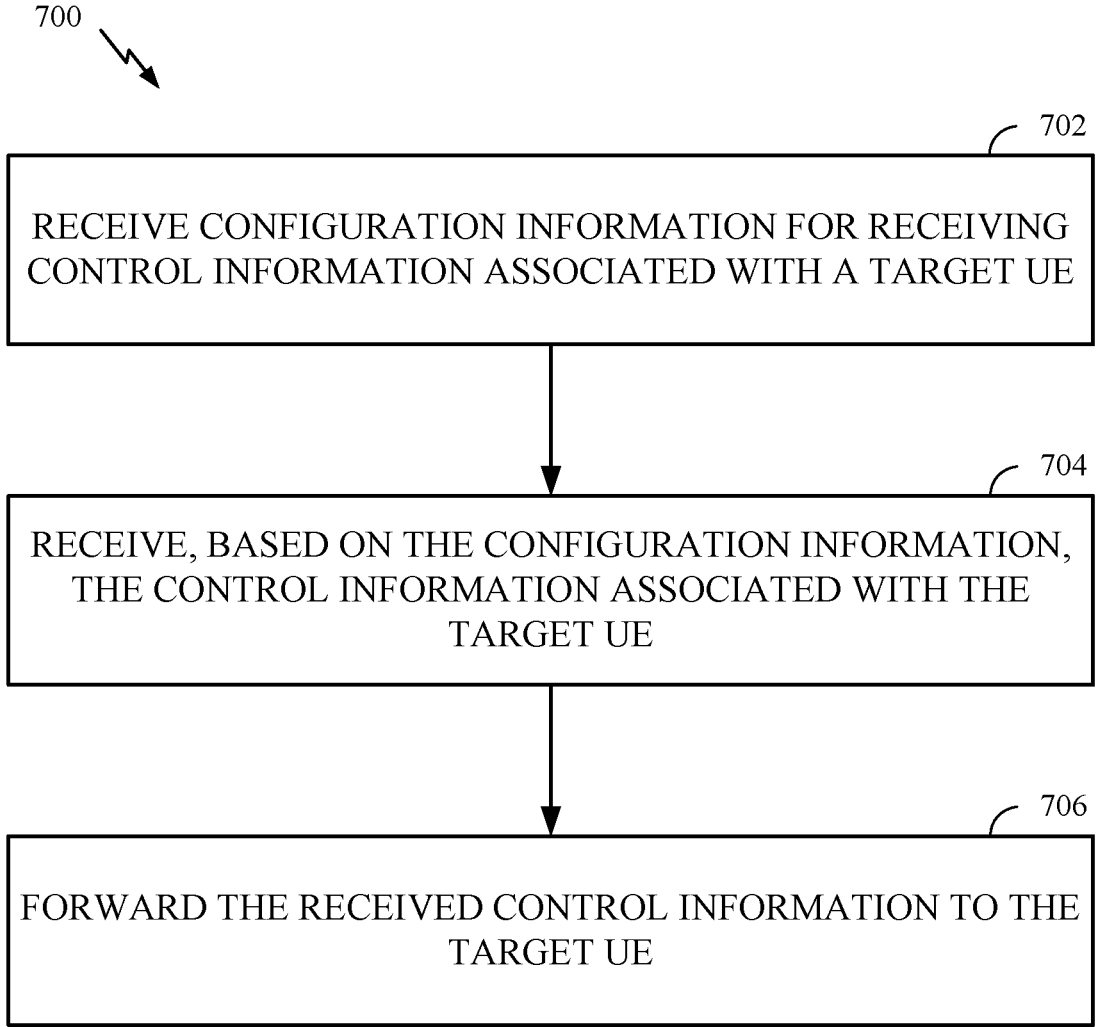
FIG. 7 is a flow diagram illustrating example operations for wireless communication by a cooperation UE, in accordance with certain aspects of the present disclosure.

FIG. 7 is a flow diagram illustrating example operations 700 for wireless communication, in accordance with certain aspects of the present disclosure. The operations 700 may be performed, for example, by a cooperative UE (e.g., such as the UE 502b and/or 502c, which may be examples of the UE 120a in the wireless communication network 100) for DCI cooperation. The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 702, by receiving configuration information for receiving control information associated with a target UE.

At block 704, the cooperative UE receives, based on the configuration information, the control information associated with the target UE.

At block 706, the cooperative UE forwards the received control information to the target UE.

Figure 8:
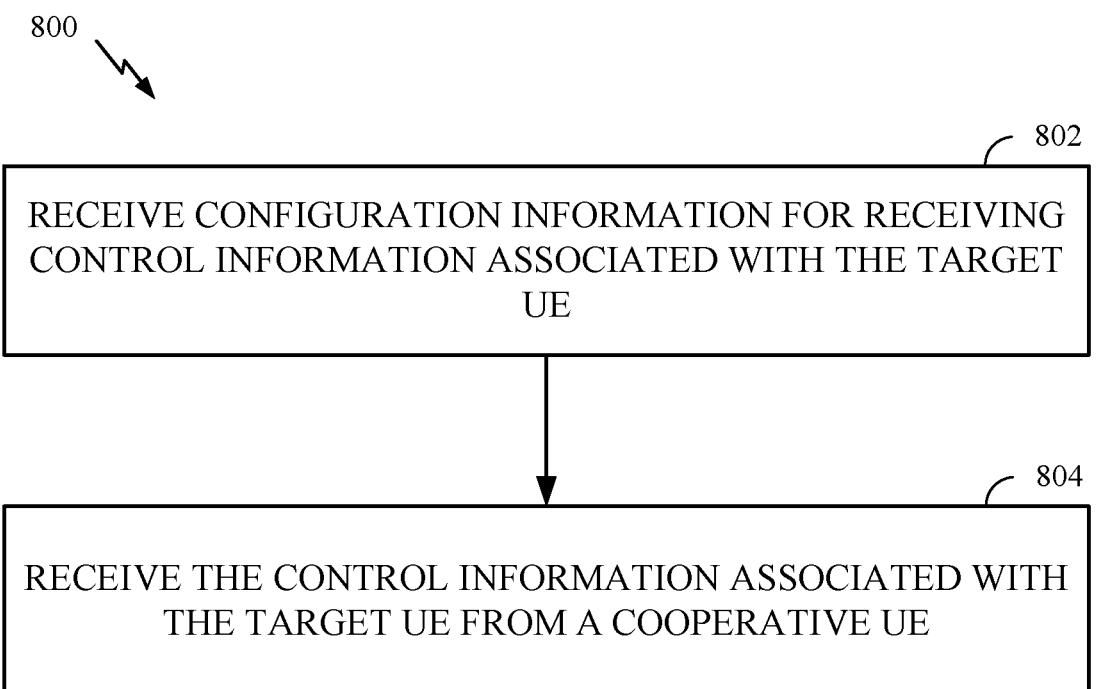
FIG. 8 is a flow diagram illustrating example operations for wireless communication by a target UE, in accordance with certain aspects of the present disclosure.

FIG. 8 is a flow diagram illustrating example operations 800 for wireless communication, in accordance with certain aspects of the present disclosure. The operations 800 may be performed, for example, by a target UE (e.g., such as the UE 502a, which may be an example of the UE 120a in the wireless communication network 100) for DCI cooperation. The operations 800 may be complementary to the operations 700 performed by the cooperative UE. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at block 802, by receiving configuration information for receiving control information associated with the target UE.

At block 804, the target UE receives the control information associated with the target UE from a cooperative UE.

As noted above, aspects of the present disclosure provide techniques for DCI cooperation whereby a cooperative UE (or panel) may receive control information associated with a target UE (or panel) (e.g., from one or more TRPs of a base station/gNB) based on configuration information. In some cases, the control information comprises DCI transmitted by the base station on a PDCCH. Additionally, in some cases, the UE may receive the configuration information for receiving the control channel associated with the target UE from at least one of the base station/gNB or from the target UE.

Thereafter, once the cooperative UE has received the control information associated with the target UE (e.g., from the base station), the cooperative UE may forward the received control information to the target UE. In some cases, different options may exist for the contents of the control information that is forwarded by the cooperative UE to the target UE, which may depend on the configuration information received by the cooperative UE.

For example, in a first option, the contents of the control information transmitted to the target UE may include one or more in-phase and quadrature (IQ) samples corresponding to a PDCCH associated with the target UE, which may be forwarded to the target UE. This option may be minimally labor intensive (e.g., requiring a small amount of processing power) to the cooperative UE and require the least amount of configuration information for receiving the control information associated with the target UE (e.g., as compared to other options described herein). For example, under the first option, the configuration information configuration information may comprise at least one of an indication of a dedicated CORESET for receiving the control information associated with the target UE or a dedicated search space for receiving the control information associated with the target UE. In some cases, the cooperative UE may rate match around a set of time-frequency resources based on the indicated dedicated CORESET and dedicated search space.

Figure 9:
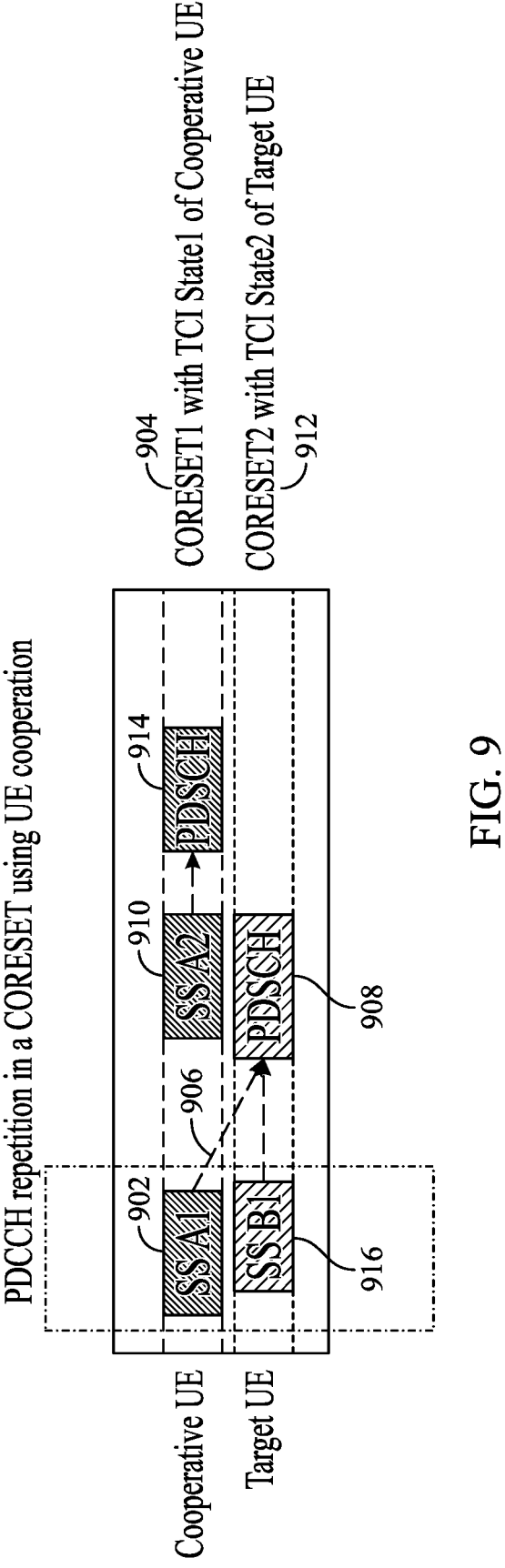
FIG. 9 illustrates example control channel cooperation techniques, in accordance with certain aspects of the present disclosure.

Accordingly, the cooperative UE may use the dedicated search space and dedicated CORESET to receive the control information associated with the target UE. For example, as illustrated in FIG. 9, the cooperative UE may receive configuration information for a first search space 902 and a first CORESET 904 for receiving control information associated with the target UE. In some cases, the first CORESET 904 may be associated with a first transmission configuration indicator (TCI) that may be used to receive the control information associated with the target UE. As shown, the cooperative UE may monitor the first search space 902 and first CORESET 904 for the control information associated with target UE. Based on the monitoring, the cooperative UE may receive one or more IQ samples corresponding to a PDCCH associated with the target UE. The cooperative UE may then forward the one or more IQ samples to the target UE, as shown at 906.

As noted above, the control information may contain scheduling information for the target UE to receive a PDSCH 908. For example, according to aspects, the target UE may receive the control information from the cooperative UE. Thereafter, the target UE may demodulate, descramble, decode, and perform a CRC check on the control information, which may be based on configuration information received from the base station/gNB.

In some cases, the configuration information received by the target UE may include, for example, at least one of a dedicated control resource set (CORESET) associated with the target UE or a dedicated search space associated with the target UE. Additionally, in some cases, the configuration information received by the target UE may include at least one of an indication of a set of dedicated control channel candidates corresponding to the control information, one or more starting control channel elements (CCEs) for the set of dedicated control channel candidates, an aggregation level associated with the set of dedicated control channel candidates, an interleaving pattern associated with the set of dedicated control channel candidates, or a precoding granularity associated with the set of dedicated control channel candidates. Additionally, in some cases, the configuration information received by the target UE may include at least one of a radio network temporary identifier (RNTI) of the target UE, or a downlink control information (DCI) format associated with the target UE.

If decoding is successful based on the configuration information (e.g., the CRC check of the decoded control information passes), the target UE may determine scheduling information for the PDSCH 908 and may receive the PDSCH 908 based on the scheduling information.

In some cases, the cooperative UE may also be configured with a second search space 910 and a second CORESET 912 for receiving control information associated with the cooperative UE. In some cases, the second CORESET 912 may be associated with a first transmission configuration indicator (TCI) that may be used to receive the control information associated with the cooperative UE. Accordingly, as shown, the cooperative UE may monitor the second search space 910 and second CORESET 912 for the control information associated with cooperative UE. Once received, the cooperative UE may demodulate, descramble, decode, and perform a CRC check on the control information in a similar manner as the target UE. If decoding is successful (e.g., the CRC check of the decoded control information passes), the cooperative UE may determine scheduling information for a PDSCH 914 and may receive the PDSCH 914 based on the scheduling information.

According to aspects, to improve reliability of the control information associated with the target UE, in some cases, the target UE may also monitor for and receive the control information associated with the target UE. For example, in some cases, the dedicated CORESET for receiving the control information associated with the target UE may be configured with two TCI states: one TCI for the target UE and another other TCI state for the cooperative UE. For example, as shown, the target UE may be configured with a second CORESET with a second TCI state for receiving the control information. Additionally, the target UE may be configured with a second search space 916 for receiving the control information associated with the target UE. Accordingly, the target UE may monitor the second search space 916 and second CORESET 912 to separately receive the control information from the base station/gNB. In some cases, the target UE may combine the control information received from monitoring the second search space 916 with the control information received from the cooperative UE to improve reliability of the control information.

In a second option, the contents of the control information transmitted to the target UE by the cooperative UE may include demodulated control information. For example, in some cases, the cooperative UE may monitor for and receive the control information associated with the target UE from the base station/gNB. Thereafter, the UE may demodulate the control information and may forward the demodulated control information as a number of bits to the target UE. For example, as explained below, demodulation reference signal (DMRS) configurations of the target UE associated with a CORESET may be configured as wideband, and thus the cooperative UE may use all DMRS resource elements within the CORESET to perform channel estimation to all the resource elements within the CORESET. Thereafter, upon completing the channel estimation, the cooperative UE may obtain a number of demodulated symbols in terms of binary bits. The number of binary bits may include information necessary for decoding PDCCH candidates within the CORESET. The second option may be more labor intensive as compared to the first option as additional configuration information and processing power may be needed to demodulate the control information before forwarding the demodulated binary bits to the target UE.

For example, in the second option, the configuration information received by the cooperative UE may further include at least one of a set of dedicated control channel candidates corresponding to the control information, one or more starting control channel elements (CCEs) for the set of dedicated control channel candidates, an aggregation level associated with the set of dedicated control channel candidates, an interleaving pattern associated with the set of dedicated control channel candidates, or a precoding granularity associated with the set of dedicated control channel candidates.

Figure 10:
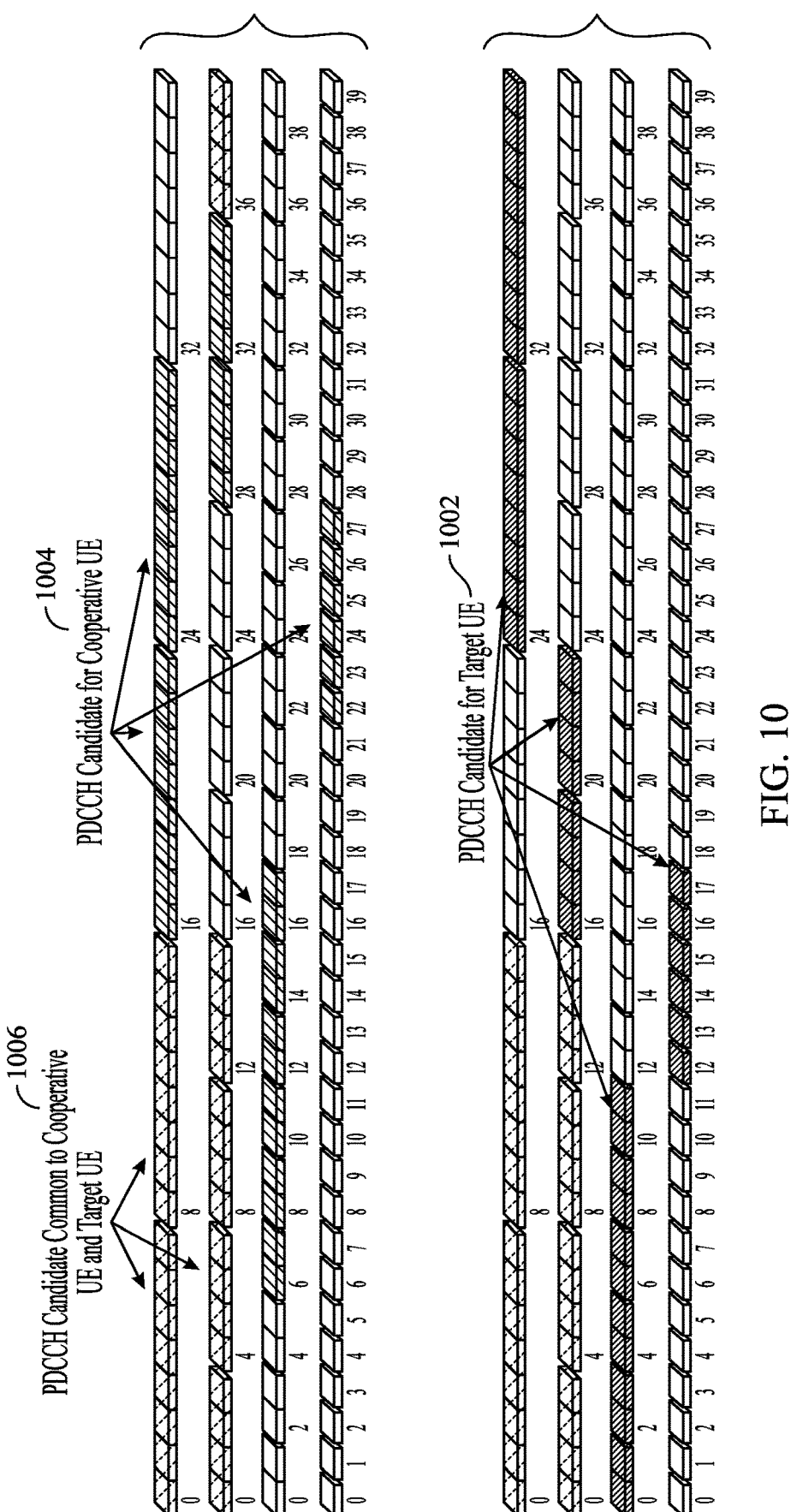
FIG. 10 illustrate different sets of dedicated control channel candidates, in accordance with aspects of the present disclosure.

Accordingly, based on the configuration information, the cooperative UE may monitor for one or more control channel candidates (e.g., PDCCH candidates) corresponding to the control information associated with the target UE. For example, as illustrated in FIG. 10, different sets of dedicated control channel candidates (e.g., PDCCH candidates), each including (or spanning) one or more resource elements (REs), may be allocated to control channels (e.g., carrying the control information) associated with the target UE and the cooperative UE. For example, as illustrated, a first set of control channel candidates 1002 may correspond to the control information associated with the target UE, a second set of control channel candidates 1004 may correspond to control information associated with the cooperative UE, and a third set of control channel candidates 1006 may be common to and correspond to both the control information associated with the target UE and the control information associated with the cooperative UE. The cooperative UE may have the configuration information of the control channel candidates 1002, such as aggregation level, the set of CCEs, and the like, such that the cooperative UE may know the exact number of resource elements and their positions which are associated with a PDCCH candidate within a CORESET. In some cases, the cooperative UE may rate match around a set of time-frequency resources based on a union of dedicated control channel candidates in one or more of the different sets of dedicated control channel candidates (e.g., 1002, 1004, and/or 1006).

According to aspects, the UE may monitor for and receive the control information associated with the target UE (e.g., by monitoring for one or more control candidates in the first set of control channel candidates 1002). Thereafter, the UE may demodulate the received control information, which may be based, for example, on at least one of the first set of dedicated control channel candidates 1002, the aggregation level associated with the first set of dedicated control channel candidates 1002, the interleaving pattern associated with the first set of dedicated control channel candidates 1002, and/or the precoding granularity associated with the first set of dedicated control channel candidates 1002.

Additionally, in some cases, demodulating the control information may be further based on channel estimation performed on a control channel over which the control information is transmitted/received (e.g., PDCCH). For example, the cooperative UE may perform channel estimation on the channel over which the control information associated with the target UE is received, based on demodulation reference signal (DMRS) configurations of the target UE. For example, the DMRS configurations of the target UE associated with a CORESET may be configured as wideband, and thus the cooperative UE may use all DMRS resource elements within the CORESET to perform channel estimation for the set of resource elements associated with a control channel (e.g., PDCCH) candidate. The cooperative UE may then demodulate the control information associated with the target UE based on the channel estimation. Thereafter, as noted, the cooperative UE may then forward the demodulated control information as a number of binary bits to the target UE. The number of binary bits may correspond to one control channel candidate and may be decoded directly (e.g., by the target UE) by channel decoding to obtain each DCI field of the control channel candidate.

In a third option, the contents of the control information transmitted to the target UE by the cooperative UE may include decoded control information. For example, in some cases, after demodulating the control information, the cooperative UE may thereafter attempt to decode the control information. If successful, the cooperative UE may forward the decoded control information to the target UE. The third option may be more labor intensive as compared to the first and second options option as additional configuration information and processing power may be needed to decode the control information before forwarding it to the target UE.

For example, in addition to the parameters discussed above for demodulating the control information, the configuration information received by the cooperative UE in the third option for decoding the control information may further include at least one of a radio network temporary identifier (RNTI) of the target UE or a downlink control information (DCI) format (including a DCI length of the control information) associated with the target UE.

Accordingly for example, in some cases, decoding the control information associated with the target UE may include monitoring for one or more control channel candidates in the first set of dedicated control channel candidates 1002 corresponding to the control information. Thereafter, based on the RNTI and DCI format associated with the target UE, the cooperative UE may attempt to descramble, decode, and perform a cyclic redundancy check (CRC) on the one or more control channel candidates. According to aspects, the control information may be successfully decoded if the CRC passes. Accordingly, if the CRC passes, the cooperative UE may then wherein forward the decoded control information to the target UE.

In some cases, monitoring for the one or more control channel candidates may be based on a blind detection (and channel estimation) capability associated with the cooperative UE. In some cases, the blind detection capability may be based on, for example, a maximum number of monitored control channel candidates and maximum number of non-overlapped CCEs. In some cases, the cooperative UE may split its blind detection capability between monitoring for the one or more control channel candidates in the first set of dedicated control channel candidates 1002 corresponding to the control information associated with the target UE and monitoring for one or more additional control channel candidates corresponding to control information associated with the cooperative UE (e.g., in the second set of control channel candidates 1004).

In such cases, when the cooperative UE splits its blind detection capability, a total number of monitored control channel candidates or non-overlapped CCEs for both the cooperative UE and the target UE may not exceed the blind detection capability of cooperative UE. According to aspects, in case of control channel overbooking (e.g., the control channel candidates or non-overlapped CCEs exceed the maximum capability of the cooperative UE), the control channel candidates/non-overlapped CCEs for target UE may be deprioritized by the cooperative UE in favor of channel candidates/non-overlapped CCEs corresponding to the cooperative UE.

Figure 11:
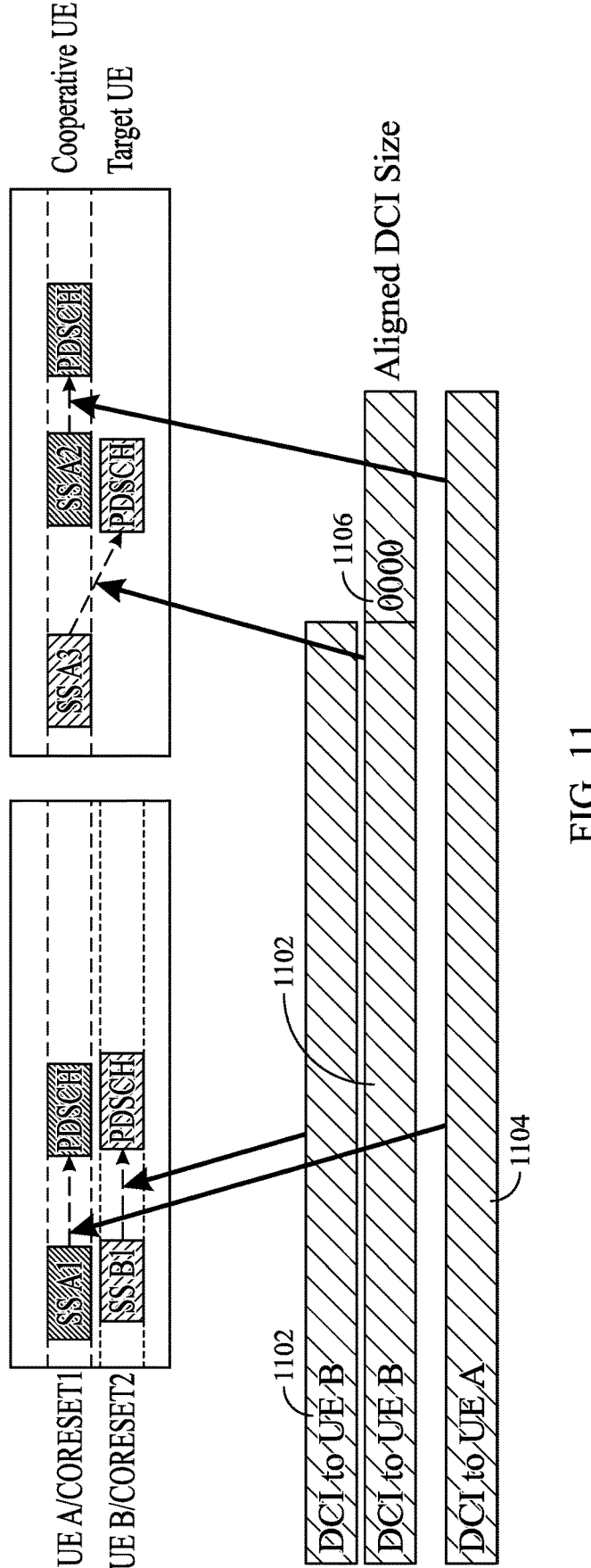
FIG. 11 illustrates example techniques for aligning control information associated with a target UE, in accordance with aspects of the present disclosure.

In some cases, when monitoring for and receiving control information associated with the target UE and control information associated with the cooperative UE, the control information associated with the target UE may be a different length than the control information associated with the cooperative UE. For example, as illustrated in FIG. 11, in some cases, the control information 1102 (e.g., DCI) associated with the target UE (e.g., UE B) may be a first length while the control information 1104 (e.g., DCI) associated with the cooperative UE (e.g., UE a) may be a second length different from the first length. In some cases, it may be difficult for the cooperative UE to decode control information associated with the target UE when then length of this control information is different from a length of the control information associated with the cooperative UE.

Accordingly, to help alleviate this issue with different lengths, when decoding the control information associated with the target UE, the cooperative UE may align the control information associated with the target UE with a length of control information associated with the cooperative UE. For example, in some cases, the cooperative UE may pad the control information associated with the target UE with one or more additional bits until the length of the control information associated with the target UE is the same as the length of the control information associated with the cooperative UE. For example, as illustrated at 1106 in FIG. 11, the cooperative UE may pad the control information 1102 associated with the target UE with a number of bits such that the length of the control information 1102 associated with the target UE is the same as the length of the control information 1104 associated with the cooperative UE.

It should be noted that while the aspects described above are generally directed to DCI cooperation techniques (e.g., in which a cooperative UE receives downlink control information from a base station and forwards the downlink control information to an intended target UE), these aspects may apply equally to uplink control information transmissions. For example, in some cases, a cooperative UE may receive uplink control information from a target UE and may forward the uplink control information to the base station using similar techniques as described above.

Figure 12:
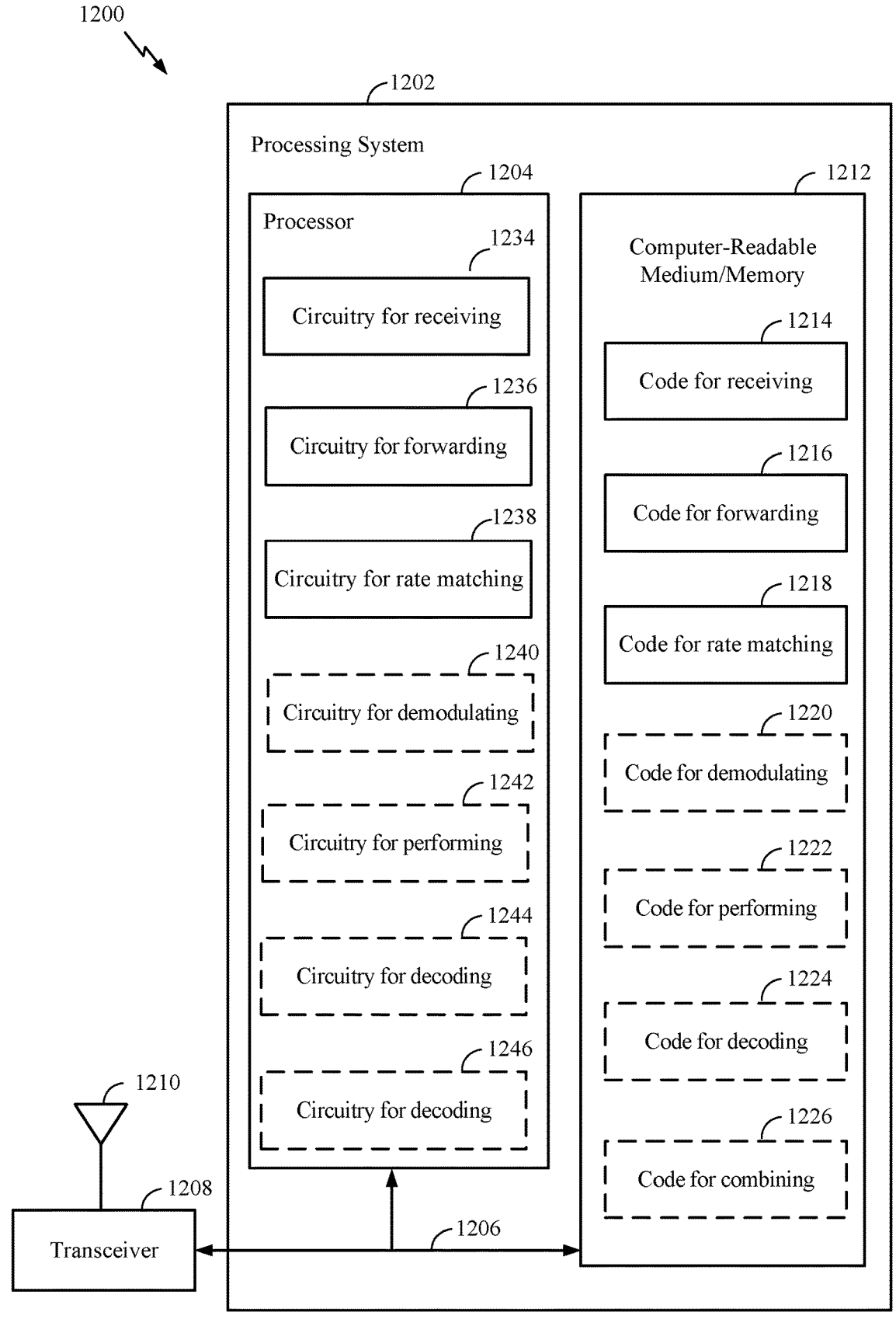
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 7-8. For example, in some cases, the communications device 1200 may be an example of a cooperative UE (e.g., UE 502b, UE 502c, UE 120b) and/or a target UE (e.g., UE 502a, UE 120a). The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200. In some cases, the transceiver 1208 may include one or more components of UE 120a with reference to FIG. 2 such as, for example, transceiver 254, MIMO detector 256, receive processor 258, TX MIMO processor 266, transmit processor 264, and/or the like.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIGS. 7-8, or other operations for performing the various techniques discussed herein for DCI cooperation. In certain aspects, computer-readable medium/memory 1212 stores code 1214 for receiving, code 1216 for forwarding, code 1218 for rate matching, code 1220 for demodulating, code 1222 for performing, code 1224 for decoding, and code 1226 for combining.

In some cases, the code 1214 for receiving may include code for receiving configuration information for receiving control information associated with a target UE.

In some cases, the code 1214 for receiving may include code for receiving, based on the configuration information, the control information associated with the target UE.

In some cases, the code 1216 for forwarding may include code for forwarding the received control information to the target UE.

In some cases, code 1214 for receiving may include code for receiving the configuration information from a base station or from the target UE.

In some cases, code 1214 for receiving may include code for receiving the one or more IQ samples in the dedicated CORESET and dedicated search space.

In some cases, the code 1216 for forwarding may include code for forwarding the IQ samples to the target UE.

In some cases, the code 1218 for rate matching may include code for rate matching around a set of time-frequency resources based on the indicated dedicated CORESET and dedicated search space.

In some cases, the code 1220 for demodulating may include code for demodulating the control information based on at least one of a set of dedicated control channel candidates, an aggregation level, an interleaving pattern, or a precoding granularity.

In some cases, the code 1222 for performing may include code for performing channel estimation associated with a control channel over which the control information is transmitted.

In some cases, the code 1216 for forwarding may include code for forwarding the demodulated control information as a number of binary bits to the target UE.

In some cases, the code 1218 for rate matching may include code for rate matching around a set of time-frequency resources based on a union of dedicated control channel candidates in the set of dedicated control channel candidates.

In some cases, the code 1224 for decoding may include code for decoding the control information associated with the target UE based on at least one of the indicated set of dedicated control channel candidates, the RNTI of the target UE, or the DCI format associated with the target UE.

In some cases, the code 1216 for forwarding may include code for forwarding the decoded control information to the target UE.

In some cases, the code 1224 for decoding may include code for monitoring for one or more control channel candidates in the set of dedicated control channel candidates corresponding to the control information. Additionally, in some cases, the code 1224 for decoding may include code for descrambling, decoding, and performing a cyclic redundancy check (CRC) on the one or more control channel candidates.

In some cases, the code 1224 for decoding may include code for aligning the control information associated with the target UE with a length of control information associated with the cooperative UE.

In some cases, the code 1224 for decoding may include code for padding the control information associated with the target UE with one or more additional bits.

In some cases, the code 1214 for receiving may include code for receiving configuration information for receiving control information associated with the target UE.

In some cases, the code 1214 for receiving may include code for receiving the control information associated with the target UE from a cooperative UE.

In some cases, the code 1214 for receiving may include code for separately receiving the control information associated with the target UE from a base station.

In some cases, the code 1226 for combining may include code for combining the control information received from the base station with the control information received from the cooperative UE.

According to aspects, the processor 1204 includes code 1214 for receiving, code 1216 for forwarding, code 1218 for rate matching, code 1220 for demodulating, code 1222 for performing, code 1224 for decoding, and code 1226 for combining—

Example Aspects

Implementation examples are described in the following numbered clauses:

1. A method for wireless communication by a cooperative user equipment (UE), comprising: receiving configuration information for receiving control information associated with a target UE; receiving, based on the configuration information, the control information associated with the target UE; and forwarding the received control information to the target UE.
2. The method of Aspect 1, wherein the control information comprises downlink control information (DCI) transmitted on a physical downlink control channel (PDCCH).
3. The method of any of Aspects 1-2, wherein receiving the configuration information for the control information associated with the target UE comprises at least one of: receiving the configuration information from a base station; or receiving the configuration information from the target UE.
4. The method of any of Aspects 1-3, wherein the configuration information comprises at least one of an indication of a dedicated control resource set (CORESET) for receiving the control information associated with the target UE or a dedicated search space for receiving the control information associated with the target UE.
5. The method of Aspect 4, wherein the control information associated with the target UE comprises one or more in-phase and quadrature (IQ) samples corresponding to a physical downlink control channel (PDCCH).
6. The method of Aspect 5, wherein receiving the control information associated with the target UE comprises receiving the one or more IQ samples in the dedicated CORESET and dedicated search space.
7. The method of any of Aspects 5-6, wherein forwarding the received control information to the target UE comprises forwarding the IQ samples to the target UE.
8. The method of any of Aspects 5-7, further comprising rate matching around a set of time-frequency resources based on the indicated dedicated CORESET and dedicated search space.
9. The method of any of Aspects 1-8, the configuration information comprises at least one of an indication of a set of dedicated control channel candidates corresponding to the control information, one or more starting control channel elements (CCEs) for the set of dedicated control channel candidates, an aggregation level associated with the set of dedicated control channel candidates, an interleaving pattern associated with the set of dedicated control channel candidates, or a precoding granularity associated with the set of dedicated control channel candidates.
10. The method of Aspect 9, further comprising demodulating the control information based on at least one of the set of dedicated control channel candidates, the aggregation level, the interleaving pattern, or the precoding granularity.
11. The method of Aspect 10, further comprising performing channel estimation associated with a control channel over which the control information is transmitted, wherein demodulating the control information if further based on the channel estimation.
12. The method of any of Aspects 10-11, wherein forwarding the received control information to the target UE comprises forwarding the demodulated control information as a number of binary bits to the target UE.
13. The method of any of Aspects 9-12, further comprising rate matching around a set of time-frequency resources based on a union of dedicated control channel candidates in the set of dedicated control channel candidates.
14. The method of any of Aspects 1-13, wherein the configuration information comprises at least one of an indication of a set of dedicated control channel candidates corresponding to the control information, a radio network temporary identifier (RNTI) of the target UE, or a downlink control information (DCI) format associated with the target UE.
15. The method of Aspect 14, further comprising decoding the control information associated with the target UE based on at least one of the indicated set of dedicated control channel candidates, the RNTI of the target UE, or the DCI format associated with the target UE.
16. The method of Aspect 15, wherein forwarding the received control information to the target UE comprises forwarding the decoded control information to the target UE.
17. The method of any of Aspects 15-16, wherein decoding the control information comprises: monitoring for one or more control channel candidates in the set of dedicated control channel candidates corresponding to the control information; and descrambling, decoding, and performing a cyclic redundancy check (CRC) on the one or more control channel candidates.
18. The method of Aspect 17, wherein monitoring for the one or more control channel candidates is based on a blind detection capability associated with the cooperative UE.
19. The method of Aspect 18, wherein the blind detection capability is based on at least one of a maximum number of control channel candidates that may be monitored by the cooperative UE a maximum number of non-overlapped control channel elements (CCEs).
20. The method of any of Aspects 18-19, wherein the blind detection capability is split between monitoring for the one or more control channel candidates in the set of dedicated control channel candidates corresponding to the control information associated with the target UE and monitoring for one or more additional control channel candidates corresponding to control information associated with the cooperative UE.
21. The method of Aspect 20, wherein, when overbooking of control channel candidates occurs, monitoring for the one or more additional control channel candidates corresponding to control information associated with the cooperative UE is prioritized over monitoring for the one or more control channel candidates in the set of dedicated control channel candidates corresponding to the control information associated with the target UE.

22. The method of any of Aspects 15-21, wherein decoding the control information associated with the target UE comprises aligning the control information associated with the target UE with a length of control information associated with the cooperative UE.

23. The method of Aspect 22, wherein aligning the control information associated with the target UE with a length of control information associated with the cooperative UE comprises padding the control information associated with the target UE with one or more additional bits.

24. A method for wireless communication by a target user equipment (UE), comprising: receiving configuration information for receiving control information associated with the target UE; and receiving the control information associated with the target UE from a cooperative UE.

25. The method of Aspect 24, wherein the control information comprises downlink control information (DCI) transmitted by a base station on a physical downlink control channel (PDCCH).

26. The method of any of Aspects 24-25, wherein the configuration information comprises at least one of: an indication of a dedicated control resource set (CORE-SET) for receiving the control information associated with the target UE; a dedicated search space for receiving the control information associated with the target UE; an indication of a set of dedicated control channel candidates corresponding to the control information; one or more starting control channel elements (CCEs) for the set of dedicated control channel candidates; an aggregation level associated with the set of dedicated control channel candidates; an interleaving pattern associated with the set of dedicated control channel candidates; a precoding granularity associated with the set of dedicated control channel candidates; a radio network temporary identifier (RNTI) of the target UE; or a downlink control information (DCI) format associated with the target UE.

27. The method of any of Aspects 24-26, wherein the control information associated with the target UE comprises at least one of: one or more in-phase and quadrature (1Q) samples corresponding to a physical downlink control channel (PDCCH) received by the cooperative UE; control information demodulated by the cooperative UE; or control information decoded by the cooperative.

28. The method of any of Aspects 24-27, further comprising: separately receiving the control information associated with the target UE from a base station; and combining the control information received from the base station with the control information received from the cooperative UE.X. An apparatus comprising means for performing the method of any of aspects 1 through (X−1).

29. An apparatus comprising at least one processor and a memory coupled to the at least one processor, the memory comprising code executable by the at least one processor to cause the apparatus to perform the method of any of aspects 1 through 28.

30. A computer readable medium storing computer executable code thereon for wireless communications that, when executed by at least one processor, cause an apparatus to perform the method of any of aspects 1 through 29.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (TR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8, as well as other operations described herein for DCI cooperation.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communication by a cooperative user equipment (UE),
comprising:
    receiving configuration information for receiving control information associated with a target UE;
    receiving, based on the configuration information, the control information associated with the target UE; and
    forwarding the received control information to the target UE, wherein forwarding the received control information comprises forwarding at least one of:
    one or more in-phase and quadrature (IQ) samples corresponding to a physical downlink control channel (PDCCH);
    demodulated control information comprising a number of binary bits; or
    decoded control information.

2. The method of claim 1, wherein the control information comprises downlink control information (DCI) transmitted on a physical downlink control channel (PDCCH).

3. The method of claim 1, wherein receiving the configuration information for the control information associated with the target UE comprises at least one of:
    receiving the configuration information from a base station; or
    receiving the configuration information from the target UE.

4. The method of claim 1, wherein the configuration information comprises at least one of an indication of a dedicated control resource set (CORESET) for receiving the control information associated with the target UE or a dedicated search space for receiving the control information associated with the target UE.

5. The method of claim 4, wherein receiving the control information associated with the target UE comprises receiving the one or more IQ samples in the dedicated CORESET and dedicated search space.

6. The method of claim 4, further comprising rate matching around a set of time-frequency resources based on the indicated dedicated CORESET and dedicated search space.

7. The method of claim 1, the configuration information comprises at least one of an indication of a set of dedicated control channel candidates corresponding to the control information, one or more starting control channel elements (CCEs) for the set of dedicated control channel candidates, an aggregation level associated with the set of dedicated control channel candidates, an interleaving pattern associated with the set of dedicated control channel candidates, or a precoding granularity associated with the set of dedicated control channel candidates.

8. The method of claim 7, further comprising demodulating the control information based on at least one of the set of dedicated control channel candidates, the aggregation level, the interleaving pattern, or the precoding granularity.

9. The method of claim 8, further comprising performing channel estimation associated with a control channel over which the control information is transmitted, wherein demodulating the control information if further based on the channel estimation.

10. The method of claim 7, further comprising rate matching around a set of time-frequency resources based on a union of dedicated control channel candidates in the set of dedicated control channel candidates.

11. The method of claim 1, wherein the configuration information comprises at least one of an indication of a set of dedicated control channel candidates corresponding to the control information, a radio network temporary identifier (RNTI) of the target UE, or a downlink control information (DCI) format associated with the target UE.

12. The method of claim 11, further comprising decoding the control information associated with the target UE based on at least one of the indicated set of dedicated control channel candidates, the RNTI of the target UE, or the DCI format associated with the target UE.

13. The method of claim 12, wherein decoding the control information comprises:

monitoring for one or more control channel candidates in the set of dedicated control channel candidates corresponding to the control information; and descrambling, decoding, and performing a cyclic redundancy check (CRC) on the one or more control channel candidates.

14. The method of claim 13, wherein monitoring for the one or more control channel candidates is based on a blind detection capability associated with the cooperative UE.

15. The method of claim 14, wherein the blind detection capability is based on at least one of a maximum number of control channel candidates that may be monitored by the cooperative UE a maximum number of non-overlapped control channel elements (CCEs).

16. The method of claim 14, wherein the blind detection capability is split between monitoring for the one or more control channel candidates in the set of dedicated control channel candidates corresponding to the control information associated with the target UE and monitoring for one or more additional control channel candidates corresponding to control information associated with the cooperative UE.

17. The method of claim 16, wherein, when overbooking of control channel candidates occurs, monitoring for the one or more additional control channel candidates corresponding to control information associated with the cooperative UE is prioritized over monitoring for the one or more control channel candidates in the set of dedicated control channel candidates corresponding to the control information associated with the target UE.

18. The method of claim 12, wherein decoding the control information associated with the target UE comprises aligning the control information associated with the target UE with a length of control information associated with the cooperative UE.

19. The method of claim 18, wherein aligning the control information associated with the target UE with a length of control information associated with the cooperative UE comprises padding the control information associated with the target UE with one or more additional bits.

20. A method for wireless communication by a target user equipment (UE), comprising:

receiving configuration information for receiving control information associated with the target UE; and receiving the control information associated with the target UE from a cooperative UE, wherein receiving the control information comprises receiving at least one of:

one or more in-phase and quadrature (IQ) samples corresponding to a physical downlink control channel (PDCCH);

demodulated control information comprising a number of binary bits; or decoded control information.

21. The method of claim 20, wherein the control information comprises downlink control information (DCI) transmitted by a base station on a physical downlink control channel (PDCCH).

22. The method of claim 20, wherein the configuration information comprises at least one of:

an indication of a dedicated control resource set (CORESET) for receiving the control information associated with the target UE;

a dedicated search space for receiving the control information associated with the target UE;

an indication of a set of dedicated control channel candidates corresponding to the control information;

one or more starting control channel elements (CCEs) for the set of dedicated control channel candidates;

an aggregation level associated with the set of dedicated control channel candidates;

an interleaving pattern associated with the set of dedicated control channel candidates;

a precoding granularity associated with the set of dedicated control channel candidates;

a radio network temporary identifier (RNTI) of the target UE; or a downlink control information (DCI) format associated with the target UE.

23. The method of claim 20, further comprising:

separately receiving the control information associated with the target UE from a base station; and combining the control information received from the base station with the control information received from the cooperative UE.

24. An apparatus for wireless communication by a cooperative user equipment (UE), comprising:

one or more memories comprising executable code; and one or more processors configured to execute the executable code to cause the cooperative UE to:

receive configuration information for receiving control information associated with a target UE;

receive, based on the configuration information, the control information associated with the target UE; and forward the received control information to the target UE, wherein in order to forward the received control information, the one or more processors are configured to cause the cooperative UE to forward at least one of:

one or more in-phase and quadrature (IQ) samples corresponding to a physical downlink control channel (PDCCH);

demodulated control information comprising a number of binary bits; or decoded control information.

25. An apparatus for wireless communication by a target user equipment (UE), comprising:

one or more memories comprising executable code; and one or more processors configured to execute the executable code to cause the target UE to:

receive configuration information for receiving control information associated with the target UE; and receive the control information associated with the target UE from a cooperative UE, wherein in order to receive the control information, the one or more processors are configured to cause the target UE to receive at least one of:

one or more in-phase and quadrature (IQ) samples corresponding to a physical downlink control channel (PDCCH);

demodulated control information comprising a number of binary bits; or decoded control information.

* * * * *